US009584950B2

(12) United States Patent
Tickoo et al.

(10) Patent No.: US 9,584,950 B2
(45) Date of Patent: Feb. 28, 2017

(54) SOCIAL NETWORK FOR MOBILE NODES

(75) Inventors: Omesh Tickoo, Portland, OR (US);
Ravishankar Iyer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 451 days.

(21) Appl. No.: 13/993,144

(22) PCT Filed: Dec. 30, 2011

(86) PCT No.: PCT/US2011/068043
§ 371 (c)(1),
(2), (4) Date: Jun. 11, 2013

(87) PCT Pub. No.: WO2013/101160
PCT Pub. Date: Jul. 4, 2013

(65) Prior Publication Data
US 2014/0201281 A1 Jul. 17, 2014

(51) Int. Cl.
*G06F 15/16* (2006.01)
*H04W 4/00* (2009.01)
*H04W 8/18* (2009.01)
*H04W 4/02* (2009.01)
*H04W 4/20* (2009.01)

(52) U.S. Cl.
CPC ........... *H04W 4/003* (2013.01); *H04W 4/023* (2013.01); *H04W 4/206* (2013.01); *H04W 8/18* (2013.01)

(58) Field of Classification Search
CPC ..... H04W 4/003; H04W 4/023; H04W 4/206; H04W 8/18

USPC .......................................... 709/204
See application file for complete search history.

(56) References Cited

U.S. PATENT DOCUMENTS

| | | | |
|---|---|---|---|
| 2004/0119814 A1* | 6/2004 | Clisham et al. | 348/14.08 |
| 2008/0215623 A1 | 9/2008 | Ramer | |
| 2009/0157613 A1* | 6/2009 | Strohmenger et al. | 707/3 |
| 2010/0017237 A1 | 1/2010 | Dalesandro | |
| 2010/0281113 A1* | 11/2010 | Laine et al. | 709/204 |
| 2010/0299276 A1* | 11/2010 | Shahine et al. | 705/319 |
| 2011/0225510 A1 | 9/2011 | Lavrov | |
| 2012/0117250 A1* | 5/2012 | Santamaria et al. | 709/227 |
| 2012/0158814 A1* | 6/2012 | Sabiwalsky | 709/201 |
| 2012/0258735 A1* | 10/2012 | Monteverde | 455/456.3 |
| 2012/0278262 A1* | 11/2012 | Morgenstern | G06Q 10/10 706/12 |
| 2013/0086164 A1* | 4/2013 | Wheeler et al. | 709/204 |

OTHER PUBLICATIONS

PCT International Search Report and Written Opinion issued in corresponding PCT/US2011/068043 dated Sep. 27, 2012 (13 pages).

* cited by examiner

*Primary Examiner* — Richard G Keehn
(74) *Attorney, Agent, or Firm* — Trop Pruner & Hu, P.C.

(57) ABSTRACT

A social network may be established between mobile nodes using a wireless connection. Establishing the social network may be based on an estimated time duration of the wireless connection. In one or more embodiments, establishing the social network may also be based on a similarity of interests among of users of the nodes.

31 Claims, 4 Drawing Sheets

SOCIAL NETWORK FOR MOBILE NODES

BACKGROUND

This relates generally to wireless networks for mobile devices.

A mobile device can use a wireless communication technology to establish a network connection to another mobile device. The wireless network connection enables the mobile devices to communication with each other.

BRIEF DESCRIPTION OF THE DRAWINGS

Some embodiments are described with respect to the following figures.

DETAILED DESCRIPTION

In accordance with some embodiments, a social network may be established between mobile devices ("nodes") using a wireless connection. Such social networks established between nodes may be referred to as "wireless social networks." Establishing a wireless social network may be based on an estimated time duration of the wireless connection between the nodes. Estimating the time duration may be based on the speed, direction, planned path, destination, and/or transmission range for each node. As used herein, "planned path" refers to the expected movement of a device or vehicle in the physical world (e.g., a car travelling over a predefined series of roads to arrive at given location). Establishing the wireless social network may also be based on a similarity of interests among of users of the nodes. As used herein, "similarity of interests" refers generally to any qualitative or quantitative indication of purposes, ideas, activities, events, topics, and/or themes that may be shared by the users of the nodes. The wireless social network may enable a user of a first node to interact or share information with users of other nodes.

Figure 1:
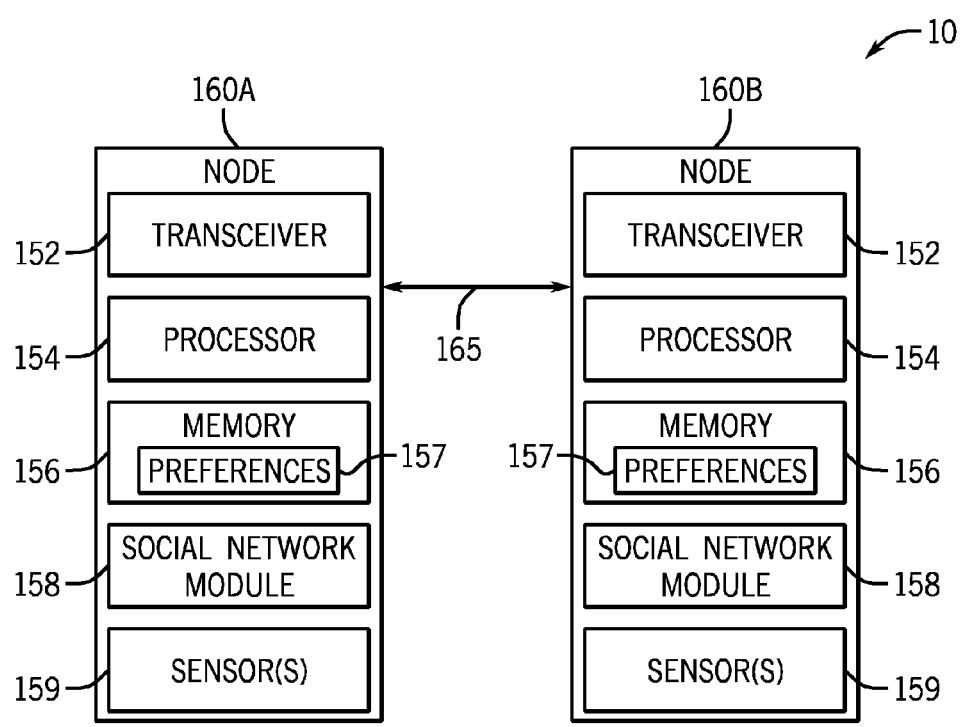
FIG. 1 is a depiction of a portion of a wireless social network in accordance with one embodiment of the present invention.

Referring to FIG. 1, a wireless social network configuration 10 may include any number of nodes 160 (e.g., nodes 160A, 160B) connected by a wireless connection 165. The nodes 160 may be any mobile devices configured to communicate via wireless communications technologies, such as a cellular telephone, a laptop computer or a handheld computer (e.g., a personal digital assistant) with a transceiver (i.e., a radio interface), etc. Further, the nodes 160 may also include any vehicles (e.g., cars, trucks, bicycles, boats, etc.) equipped with radio interfaces. Such nodes 160 may also be referred to herein as "mobile nodes."

In one or more embodiments, each node 160 may include a transceiver 152, a processor 154, a memory device 156, a social network module 158, and sensor(s) 159. Further, each node 160 may have a transmission range, meaning a physical distance over which the included transceiver 152 can effectively send or receive radio transmissions to another device. Generally, a node 160 may establish a wireless connection 165 to another node 160 if the two nodes 160 are within each other's transmission ranges.

Further, in one or more embodiments, if a first node (e.g., node 160A) is out of transmission range of a second node (e.g., node 160B), the first and second nodes may instead connect to each other through one or more intervening nodes (not shown). The intervening nodes may each act as a relay station or repeater, thus enabling the first node to connect to the second node indirectly.

The wireless connections 165 may be based on any radio communications technologies and/or standards. For example, the wireless connection 165 may be a Wi-Fi connection conforming to the IEEE (Institute of Electrical and Electronics Engineers) 802.11 standard, IEEE 802.11-2007, published Jun. 12, 2007.

In one or more embodiments, the social network module 158 may include functionality to discover other nodes 160 with which to potentially establish a wireless social network. Such functionality may include broadcasting an invitation message to invite other nodes 160 to join or establish a wireless social network. In addition, such functionality may include accepting an invitation message received from another node 160. In one or more embodiments, the invitation message may be a packet or frame including information related to the node 160 and/or the intended purpose of the wireless social network.

In one or more embodiments, the social network module 158 may also include functionality to estimate a time duration for the wireless social network (i.e., how long the node 160 is expected to maintain the wireless connection 165 to the other node(s) 160) based on the expected movements of the nodes 160 included in the wireless connection.

Further, in one or more embodiments, the social network module 158 may include functionality to determine a similarity between the interests of the user of the current node 160 (i.e., the node 160 including the social network module 158) and the users of the other nodes 160. In one or more embodiments, the interests of the users of the node 160 may be determined from preferences 157 stored in the memory device 156 included in the node 160.

In one or more embodiments, the social network module 158 may include functionality to determine whether to join a wireless social network based on the estimated time duration for the wireless connection 165 between the nodes 160, and/or a similarity of interests of the users of the nodes 160. The social network module 158 may also include functionality to establish and maintain the wireless social network. For example, the social network module 158 may use the transceiver 152 to connect to other nodes 160.

Furthermore, in one or more embodiments, the social network module 158 may also include functionality to terminate membership in the wireless social network. Such functionality may include sending a termination message to notify other nodes 160 that the sending node 160 is ending its participation in the wireless social network. Such functionality may also include updating a membership of a wireless social network based on a termination message received from another node 160.

In one or more embodiments, the wireless social network may enable the users of the connected nodes 160 to interact with each other. For example, the wireless social network may be used for communication (e.g., email, instant messaging, texting, two-way video calling, etc.), media or file sharing (e.g., movies, television, photography), gaming, sharing navigation information, etc. Further, the wireless social network may enable such activities to occur in parallel.

In one or more embodiments, the social network module 158 may interact with the sensor(s) 159. The sensor(s) 159 may be any device to collect information related to the node 160. The information may include movement information such as the speed, direction, destination, and planned path of the node 160. The information may also include a transmission range for the node 160. The information may also include a signal strength for wireless connection to the node 160. For example, the sensor(s) 159 may include a Global Positioning System (GPS) device, an onboard trip computer, a speedometer, a compass, a radio signal analysis device, a network bandwidth analysis device, or any other device or combination of devices.

The social network module 158 may be implemented in hardware, software, and/or firmware. In firmware and software embodiments it may be implemented by computer executed instructions stored in a non-transitory computer readable medium, such as an optical, semiconductor, or magnetic storage device.

Figure 2:
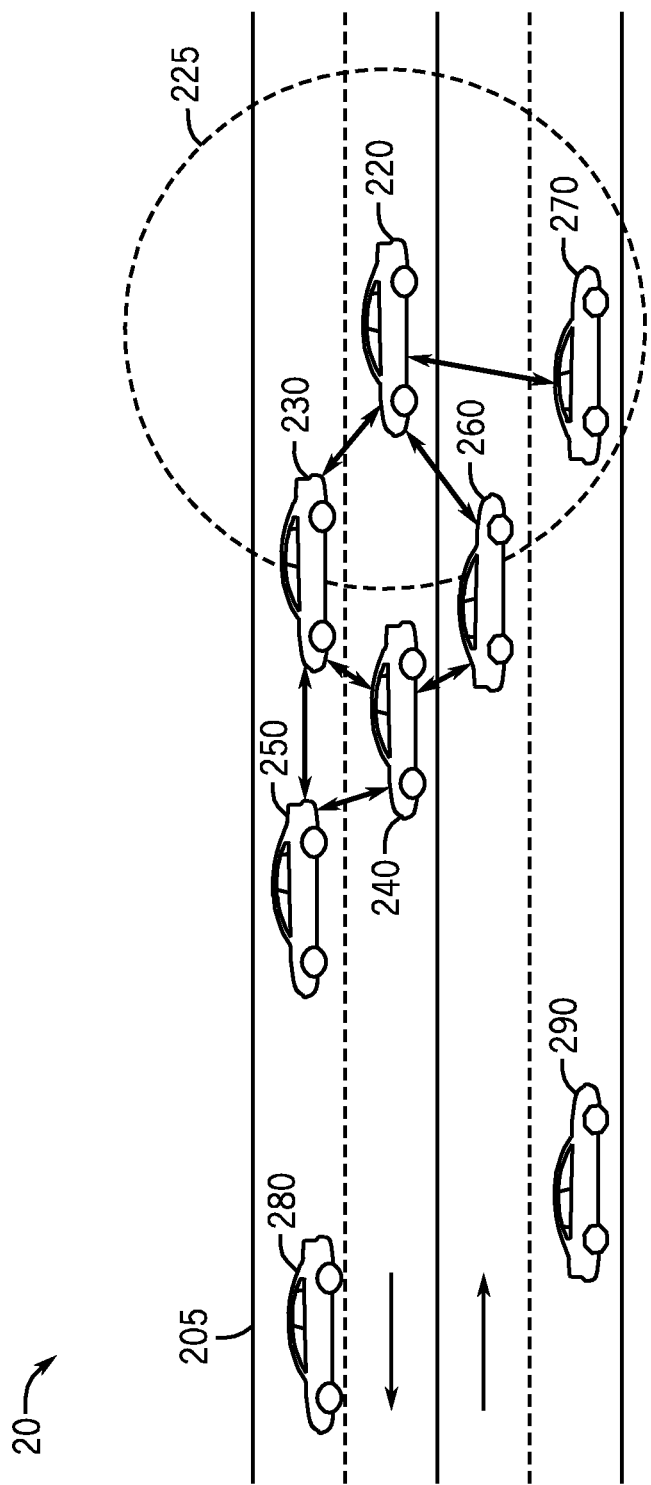
FIG. 2 is an example of a wireless social network in accordance with one embodiment of the present invention.

Referring to FIG. 2, an example 20 of establishing a wireless social network is depicted in accordance with one or more embodiments. In this example, nodes 220, 230, 240, 250, 260, 270, 280, and 290 are travelling on a highway 205. Assume that the nodes shown in FIG. 2 are equivalent to the nodes 160 shown in FIG. 1, and include the same components and functionality described above with reference to nodes 160.

Assume that a user of a first node 220 (e.g., a car equipped with an onboard computer and a WiFi transceiver) issues a command to initiate a wireless social network. In response, in one or more embodiments, the first node 220 may broadcast an invitation message to invite other nodes to join a wireless social network with the first node 220. As shown in FIG. 2, the first node 220 may have a transmission range 225 (shown in dashed line). Accordingly, in this example, any nodes within the transmission range 225 (i.e., nodes 230, 260, and 270) may receive the invitation message from the first node 220.

In response to receiving the invitation message, a receiving node (e.g., node 230) may automatically determine whether to join the wireless social network with the sending node (e.g., node 220). In one or more embodiments, the determination of whether to join the wireless social network may be based on the estimated time duration for the wireless connection between the nodes, and/or a similarity of interests of the users of the nodes. The determination of whether to join the wireless social network is described further below.

In one or more embodiments, after joining the wireless social network, any receiving node may also broadcast an invitation message to other nodes. In this manner, the wireless social network may be continually expanded to include any number of nodes. For example, referring to FIG. 2, assume that, after joining the wireless social network with node 220, node 230 also sends an invitation message. Assume further that the invitation message from node 230 is received by nodes 240 and 250. Finally, assume that node 240 and 250 accept the invitation from node 230. Accordingly, the wireless social network now includes nodes 220, 230, 240, and 250.

Note that the examples shown in FIGS. 1 and 2 are provided for the sake of illustration, and are not intended to limit embodiments of the invention. For example, embodiments of the invention may include any number and arrangement of nodes. Further, it is contemplated that wireless connections may be established using any number of intermediate nodes. Furthermore, it is contemplated that any node may also connect to external communications networks. For example, any of the nodes may also connect to an access point (not shown) to access another network (e.g., the Internet). It is also contemplated that the nodes may act as network relays for each other, thereby enabling a node to access an external network without being directly connected to an access point.

Figure 3:
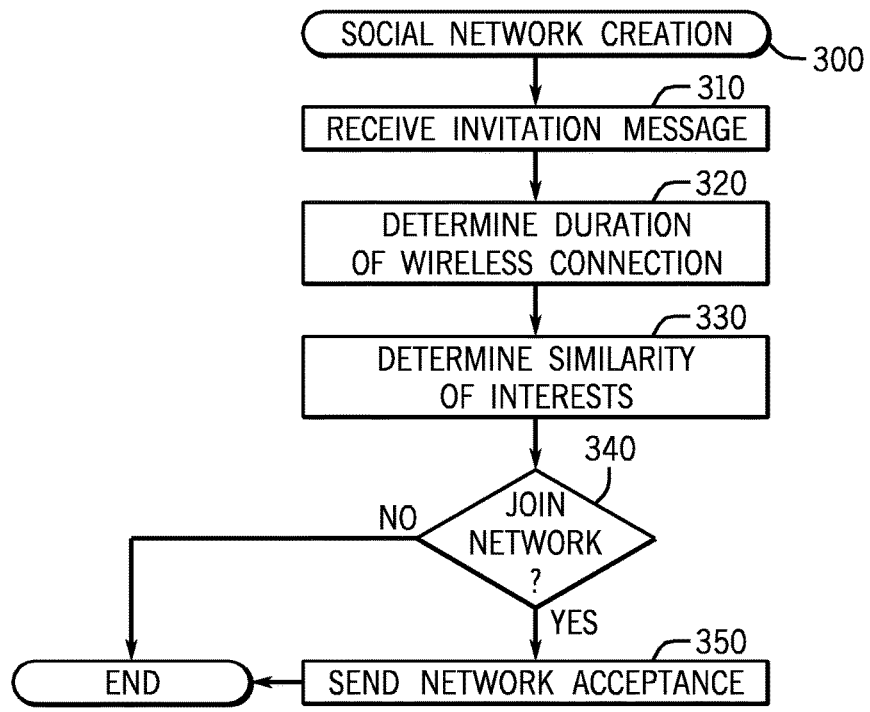
FIG. 3 is a flow chart in accordance with one embodiment of the present invention.

FIG. 3 shows a sequence 300 for social network creation in accordance with one or more embodiments. The sequence 300 may be implemented in hardware, software, and/or firmware. In firmware and software embodiments it may be implemented by computer executed instructions stored in a non-transitory computer readable medium, such as an optical, semiconductor, or magnetic storage device. In one embodiment, the sequence 300 may be part of the social network module 158 shown in FIG. 1. In another embodiment, the sequence 300 may be implemented by any other component of a node.

At step 310, an invitation message may be received. In one or more embodiments, the invitation message may be any message (e.g., one or more packets, one or more frames, etc.) configured to invite other nodes to join a wireless social network with the sending node. For example, referring to FIG. 2, node 230 may receive an invitation message to join a wireless social network with a sending node 220. In one or more embodiments, the invitation message may be generated by the social network module 158 (shown in FIG. 1) included in the sending node 220.

In one or more embodiments, the invitation message may include information related to movements of the sending node. Such movement information may include the speed, direction, and/or planned path of the sending node. For example, referring to FIG. 2, the invitation message received by node 230 may include the speed, direction, planned path, and/or destination location of node 220. In one or more embodiments, such movement information may be provided by sensor(s) 159 (e.g., a Global Positioning System (GPS) device, an onboard trip computer, a speedometer, a compass, etc.) included in node 220.

In one or more embodiments, the invitation message may also include information defining a theme or intended purpose for the wireless social network. In one or more embodiments, such information may specify interests of users of the wireless social network. For example, referring to FIG. 2, the invitation message received by node 230 may include information about one or more interests of the user(s) of node 220, and/or interests of users belonging to a particular wireless social network. Such interest information may specify activities to be performed using the wireless social network (e.g., interactive gaming, audio/video chat, media sharing, discussions, etc.). Further, such interest information may specify preferred musical styles, games, discussion topics (e.g., hobbies, television shows, movies, games, sports), etc. Furthermore, such interest information may specify a desire to share travel/navigation information among the members of the wireless social network (e.g., main or alternate route plans, rest stops, hotels, gasoline, food stops, weather information, GPS location information, maps, etc.).

In one or more embodiments, the invitation message may also include a transmission range for the sending node. The transmission range may be a predefined value associated with the sending node (e.g., a fixed value specified for a given type of transceiver and/or signal type). Alternatively, the transmission range may be obtained by a sensor 159 located in the sending node. Further, in one or more embodiments, the invitation message may also include a unique identifier for the sending node (e.g., a Media Access Control (MAC) address, an Internet Protocol (IP) address, etc.).

Referring again to FIG. 3, at step 320, a time duration may be estimated for the wireless connection (i.e., how long the wireless connection between the two nodes is expected to be available for a wireless social network). For example, referring to FIG. 2, the receiving node 230 may estimate an amount of time that a wireless connection between the nodes 220 and 230 may be expected to be available for a wireless social network. In one or more embodiments, the time duration may be estimated by the social network module 158 (shown in FIG. 1) included in the receiving node 230.

In one or more embodiments, the duration for the wireless connection may be estimated by determining the amount of time that will elapse before one connected node physically moves out of the transmission range of the other connected node. In one or more embodiments, this determination involves predicting the future movements of each node based on the current speed, direction, planned path, and/or destination location of each node. The predicted movements of the nodes may then be used to estimate a point in time (if any) when at least one node moves out of the transmission range of another node. The estimated duration may be a quantitative measure (e.g., hours, minutes, etc.), a qualitative measure (e.g., high, medium, low), or some combination thereof.

For an example of duration estimation, referring to FIG. 2, assume that node 230 and node 220 are travelling in the same direction (e.g., west) at sixty miles per hour (i.e., one mile per minute). Assume further that these nodes will follow the same planned path for the next two miles, after which the planned path of node 230 will diverge from the planned path of node 220 (e.g., travel over road A then turn right on road B, etc.). Note that this divergence can be expected in two minutes (i.e., after travelling two miles at sixty miles per hour). Finally, assume that, based on the geometry of their diverging planned paths and their speeds, node 230 will exit the transmission range of node 220 within thirty seconds after diverging. At this point in time, the wireless connection between node 230 and node 220 will be broken, and will no longer be available for a wireless social network between these nodes. Accordingly, in this example, a social network module 158 included in node 220 or node 230 may estimate the duration of this wireless connection to be two minutes and thirty seconds.

In one or more embodiments, the duration for the wireless connection may be estimated by determining the speed of separation between the nodes (i.e., the speed at which one node is moving towards or away from the other node). In one or more embodiments, the speed of separation may be obtained by measuring the strength of the signal received from the other node at two different points in time. For example, referring to FIG. 2, node 230 may estimate the change in distance to node 220 based on the increase or decrease in signal strength received from node 220 over a given unit of time.

Referring again to FIG. 3, at step 330, a similarity of interests for the users of the nodes may be determined. For example, referring to FIG. 2, the receiving node 230 may determine a measure of the similarity between the interests of the users of the sending node 220 and the interests of the users of the receiving node 230. In one or more embodiments, the similarity of interest may be determined by the social network module 158 (shown in FIG. 1) included in the receiving node 230.

In one or more embodiments, the measure of similarity may be determined using interest information included in the invitation message. For example, the invitation message may include information identifying a theme or intended purpose for the social network, one or more topics of discussion, a list of activities, etc. Further, referring to FIG. 1, the preferences 157 may include information specifying one or more interests of users of the receiving node 230. In one or more embodiments, the social network module 158 of the receiving node 230 may compare the information included in the invitation message to the information included in the preferences 157, and thereby determine the measure of similarity. Determining the measure of similarity may include any quantitative or qualitative comparison. For example, the measure of similarity may be a simple matching of specific criteria (e.g., true/false match of a theme or interest), may be a numerical or percentage score based on the degree of similarity, may be a weighted score based on multiple criteria, etc.

Optionally, in one or more embodiments, the measure of similarity may be based on the planned path and/or destination of each node. For example, the social network module 158 may determine the similarity of interests based on both nodes having the same destination of travel, sharing the same planned path for a given period of time, intending to stop at the same attraction locations along the planned path, etc.

Referring again to FIG. 3, a determination about whether to join the wireless social network may be made at step 340. In one or more embodiments, this determination may be based on the estimated time duration for the wireless connection (from step 320), the similarity of interests (from step 330), or some combination thereof. For example, referring to FIG. 2, node 230, node 260, and node 270 have received an invitation message from node 220. In one or more embodiments, each node receiving the invitation message may determine whether to join the wireless social network with node 220 based in part on the estimated time duration of the wireless connection exceeding some predefined minimum time of connection (e.g., ten minutes, one hour, etc.). Assume that node 230 determines that, because it is traveling in the same direction and speed as node 220, the estimated duration equals or exceeds a minimum threshold, and therefore node 230 may join the wireless social network with node 220. Further, assume that, because node 260 and node 270 are travelling in an opposite direction to node 220, the estimated duration is less than the minimum threshold, and therefore node 260 and node 270 will not join the wireless social network with node 220.

Assume further that, having determined that the estimated duration equals or exceeds the minimum threshold, node 230 may also determine whether to join the wireless social network with node 220 based in part on having a minimum similarity of interests between the users of node 230 and the users of node 220. For example, node 230 may determine whether a match exists for at least a minimum number of interests, for a minimum percentage of interests, for a specific theme or destination, etc.

In one or more embodiments, the determination about whether to join the wireless social network may be based on combined scores giving proportional weights for the estimated time duration and for the similarity of interests (e.g., 40 percent weight for estimated time duration and 60 percent weight for a similarity of interests).

In one or more embodiments, the determination about whether to join the wireless social network may be made using a list of preferred friends for wireless social networks. In one or more embodiments, the preferred friends list may identify other nodes which the current user wishes to automatically connect to in a wireless social network. For example, assume that the invitation message includes a unique identifier for the sending node 220. The receiving node 230 may use the unique identifier in the invitation message to determine that the sending node 220 is specified as a preferred friend. Thus, in this example, the receiving node 230 connects to the sending node 220 without determining a similarity of interests between the users of the nodes. In one or more embodiments, the preferred friends list may be stored in the preferences 157 shown in FIG. 1.

In one or more embodiments, the determination about whether to join the wireless social network may involve notifying a user of the invitation message, and requesting approval from the user to join the wireless social network. For example, referring to FIG. 1, the social network module 158 may notify a user of node 160 that an invitation message has been received. The notification may be performed using any technique, such as a graphical user interface, a text message, a visual indicator, an audible indicator, etc. The social network module 158 may present the user with a user interface to indicate a preference about whether to join the wireless social network. In one or more embodiments, the social network module 158 may only notify the user after determining that requirements for the estimated duration and/or the similarity of interests are satisfied.

If it is determined at step 340 to not join the wireless social network, then the sequence 300 ends. However, if it is determined at step 340 to join the wireless social network, then at step 350, an acceptance message may be sent to join the wireless social network. In one or more embodiments, the acceptance message include a unique identifier for the node sending the acceptance message. For example, referring to FIG. 2, node 230 may send an acceptance message (including an identifier for node 230) to node 220, thereby indicating that node 230 will join a wireless social network with node 220. In one or more embodiments, the acceptance message may be generated by the social network module 158 (shown in FIG. 1) included in the node sending the acceptance message.

Further, in one or more embodiments, any nodes receiving the acceptance message may update a membership of the wireless social network to include the node sending the acceptance message. For example, referring to FIG. 2, node 220 may update a data structure defining members of the wireless social network to include a unique identifier for node 230. Once the node 220 joins the wireless social network, the users of nodes 220 and 230 interact with each other. For example, the users of nodes 220 and 230 may use the wireless social network for communication, media/file sharing, gaming, sharing navigation information, etc. After step 350, the sequence 300 ends.

Figure 4:
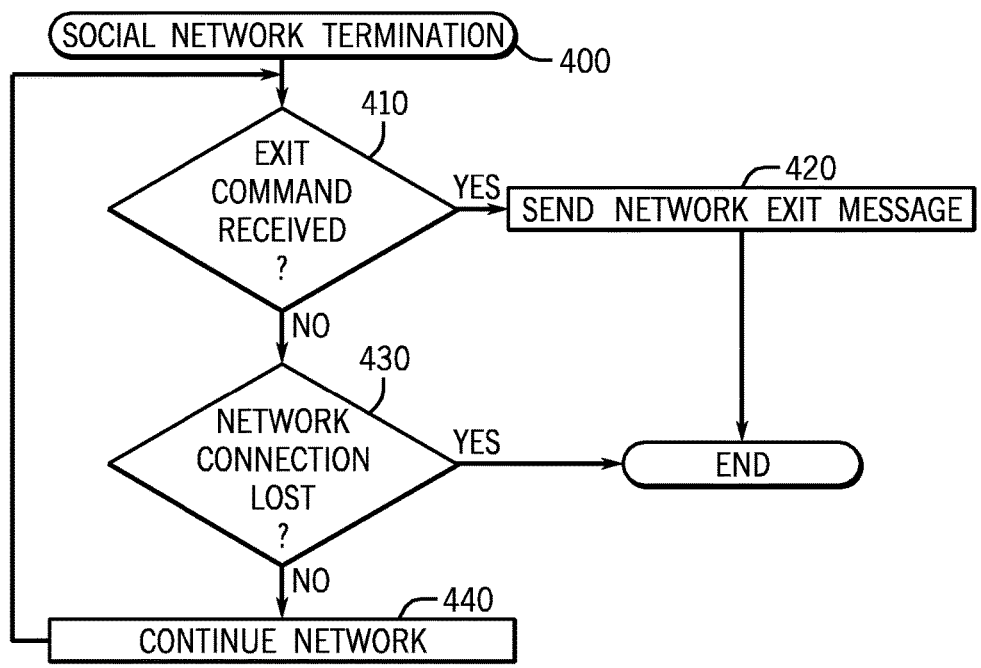
FIG. 4 is a flow chart in accordance with one embodiment of the present invention.

Referring to FIG. 4, a sequence 400 for terminating a wireless social network is depicted in accordance with one or more embodiments. The sequence 400 may be implemented in hardware, software, and/or firmware. In firmware and software embodiments it may be implemented by computer executed instructions stored in a non-transitory computer readable medium, such as an optical, semiconductor, or magnetic storage device. In one embodiment, the sequence 400 may be part of the social network module 158 shown in FIG. 1. In another embodiment, the sequence 400 may be implemented by any other component of node 160.

At step 410, a determination about whether an exit command has been received may be made. For example, referring to FIG. 2, assume that a user of node 230 has issued a command to exit a wireless social network with node 220. In one or more embodiments, the user may issue the exit command by interacting with a social network module 158 of node 230 (e.g., using a graphical user interface, touch interface, voice interface, etc.).

Referring again to FIG. 4, if it is determined at step 410 that an exit command has been received, then at step 420, an exit message may be sent to other nodes in the wireless social network. In response to the exit message, other nodes may remove an identifier for the node sending the exit message from the membership list of the wireless social network. Alternatively, in one or more embodiments, the wireless social network may be disbanded altogether in response to the exit message. In one or more embodiments, the exit message may be generated by the social network module 158. After step 420, the sequence 300 ends.

However, if it is determined at step 410 that an exit command has not been received, then a determination about whether the network connection used by the wireless social network has been lost may be made at step 430. For example, referring to FIG. 2, node 230 may determine that the wireless connection to node 220 has been lost. Such a loss in connection may occur because the distance between the two nodes has increased such that one node is out of transmission range of the other node, due to equipment failure, due to interference, etc.

If it is determined at step 430 that the network connections used by the wireless social network have been lost, then the node exits the wireless social network, and the sequence 400 ends. However, if it is determined at step 430 that at least one network connection used by the wireless social network has not been lost, then at step 440, the wireless social network (or a portion thereof) may continue to operate. For example, referring to FIG. 2, node 230 may determine that the wireless connection to node 220 has not been lost, and the wireless social network continues to operate.

In one or more embodiments, if only some subset of network connections have been lost, the wireless social network may be continued by the nodes joined by the remaining network connections. For example, referring to FIG. 2, assume that node 230 may determine that the wireless connection to node 220 has been lost, but the wireless connection to nodes 240 and 250 is still active. Accordingly, in this example, nodes 230, 240, and 250 may be connected by the remaining wireless social network (i.e., a subset of the original wireless social network including node 220). After step 440, the sequence 400 may return to step 410.

Figure 5:
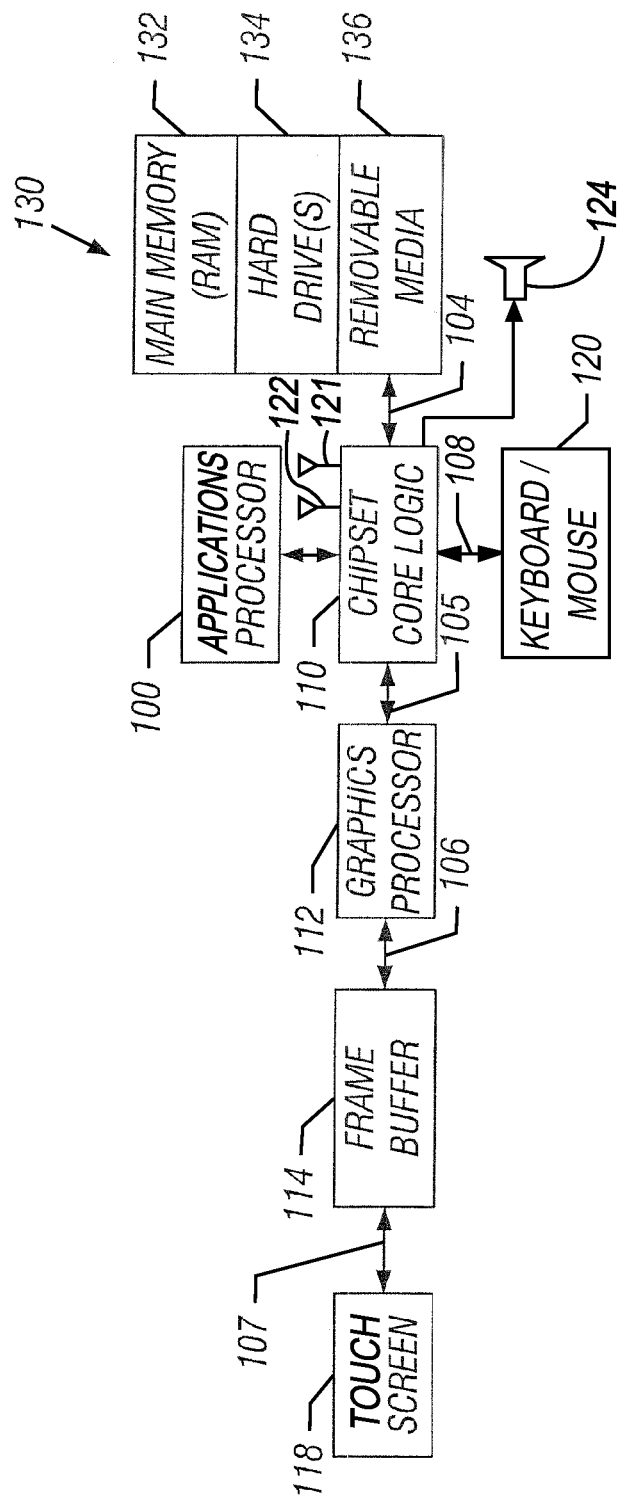
FIG. 5 is a schematic depiction of a mobile node in accordance with one embodiment of the present invention.

FIG. 5 depicts a computer system 130, which may be the nodes 160 shown in FIG. 1. The computer system 130 may include a hard drive 134 and a removable medium 136, coupled by a bus 104 to a chipset core logic 110. A keyboard and mouse 120, or other conventional components, may be coupled to the chipset core logic via bus 108. The core logic may couple to the graphics processor 112 via a bus 105, and the applications processor 100 in one embodiment. The graphics processor 112 may also be coupled by a bus 106 to a frame buffer 114. The frame buffer 114 may be coupled by a bus 107 to a display screen 118, such as a liquid crystal display (LCD) touch screen. In one embodiment, a graphics processor 112 may be a multi-threaded, multi-core parallel processor using single instruction multiple data (SIMD) architecture.

The chipset logic 110 may include a non-volatile memory port to couple the main memory 132. Also coupled to the logic 110 may be a radio transceiver and antenna(s) 121, 122. Speakers 124 may also be coupled through logic 110.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. For example, it is contemplated that the route discovery process and/or the duration estimation process may be performed at any location(s) in the network (e.g., at the client level, at the base station or access point level, at a network level, or any combination thereof). It is intended that the appended claims cover all such modifications and variations as fall within the true spirit and scope of this present invention.

What is claimed is:

1. A method comprising:
   prior to establishing a wireless social network, receiving in a second node, an invitation message to join the network from a first mobile node said invitation including information about interests of the first mobile node;
   estimating, using a computer, a duration, in the second node, of a wireless connection between the first and second mobile nodes; and
   determining, in a second node, using the computer, whether to join the network based at least in part on the determined duration of the wireless connection, and whether the estimated duration exceeds a threshold.

2. The method of claim 1 wherein establishing the wireless social network is based on a speed of at least one of the mobile nodes.

3. The method of claim 1 wherein establishing the wireless social network is based on a direction of at least one of the mobile nodes.

4. The method of claim 1 wherein establishing the wireless social network is based on a planned path of at least one of the mobile nodes.

5. The method of claim 1 wherein establishing the wireless social network is based on a transmission range of at least one of the mobile nodes.

6. The method of claim 1 wherein establishing the wireless social network is based on a destination location of at least one of the mobile nodes.

7. The method of claim 1 further comprising using the wireless social network to share navigation information.

8. The method of claim 1 further comprising,
   prior to establishing the wireless social network:
      obtaining, using the invitation message, a unique identifier for the first one of the mobile nodes; and
      determining, using the unique identifier, that the first one of the mobile nodes is included in a preferred list of wireless social network friends.

9. The method of claim 1 further comprising, prior to establishing the wireless social network:
   receiving the invitation message at the second one of the mobile nodes; and
   obtaining the information about the estimated duration of the wireless connection using the invitation message at the second one of the mobile nodes.

10. The method of claim 1 further comprising:
    receiving the invitation message at the second one of the mobile nodes; and
    sending an acceptance message from the second one of the mobile nodes to the first one of the mobile nodes.

11. The method of claim 10 further comprising obtaining, using the acceptance message, a unique identifier for the second one of the mobile nodes.

12. A non-transitory computer readable medium storing instructions executed to cause a computer to:
    prior to establishing a wireless social network, receiving in a second mobile node, an invitation message to join the network from a first mobile node, said invitation including information about interests of the first mobile node;
    estimating, using a computer, a duration, in the second node, of a wireless connection between the first mobile node and a second mobile node; and
    determining, in a second node, using the computer, whether to join the network based at least in part on the determined duration of the wireless connection and whether the estimated duration exceeds a threshold.

13. The medium of claim 12 further storing instructions to determine the estimated duration of the wireless connection based on speed and direction information for the first mobile node and the second mobile node.

14. The medium of claim 12 further storing instructions to determine the estimated duration of the wireless connection based on planned path information for the first mobile node and the second mobile node.

15. The medium of claim 12 further storing instructions to determine the measure of similarity of interests based on user interest information included in an invitation message from the first mobile node.

16. The medium of claim 12 further storing instructions to determine the measure of similarity of interests based on user interest information stored in a memory device of the second mobile node.

17. The medium of claim 12 further comprising, prior to establishing the wireless social network:
    receiving the invitation message at the second one of the mobile nodes; and
    obtaining the information about the estimated duration of the wireless connection using the invitation message at the second one of the mobile nodes.

18. The medium of claim 12 further comprising, prior to establishing the wireless social network:
    receiving the invitation message at the second one of the mobile nodes; and
    obtaining information about interests of at least one user of the first one of the mobile nodes.

19. A mobile device comprising:
    a wireless transceiver; and
    a hardware processor coupled to the wireless transceiver, the hardware processor to:
       receive in a second node, an invitation message to join the network from a first mobile node, said invitation including information about interests of the first mobile node, determine using a computer, an estimated duration of a wireless connection between the first and second mobile nodes, estimate, using the computer, a duration, in the second node, a similarity measure between interests of said first and second mobile nodes; and determine in a second node, using the computer, whether to join the network based on the determined duration of the wireless connection and whether the estimated duration exceeds a threshold.

20. The mobile device of claim 19 wherein the hardware processor is also to join the wireless social network based on a similarity of interests of a user of the mobile device and of users of the plurality of mobile nodes.

21. The mobile device of claim 19 wherein the hardware processor is also to determine the estimated duration using speed and direction information for the plurality of mobile nodes and for the plurality of mobile nodes.

22. The mobile device of claim 19 wherein the hardware processor is also to determine the estimated duration using planned path information for the mobile device and for the plurality of mobile nodes.

23. The mobile device of claim 19 wherein the hardware processor is also to determine the estimated duration using transmission range information for the mobile device and for the plurality of mobile nodes.

24. The mobile device of claim 19 wherein the hardware processor is also to, prior to joining the wireless social network, receive an invitation message from one of the plurality of mobile nodes.

25. The mobile device of claim 24 wherein the hardware processor is also to notify a user of the invitation message, and to request permission from the user to join the wireless social network.

26. The mobile device of claim 24 wherein the hardware processor is also to store a unique identifier for the wireless social network in a preferred list.

27. The mobile device of claim 19 wherein the hardware processor is also to send an acceptance message to one of the plurality of mobile nodes.

28. The mobile device of claim 19 wherein the hardware processor is also to, after joining the wireless social network, broadcast an invitation message to join the wireless social network.

29. The mobile device of claim 19 wherein the hardware processor is also to send a termination message to indicate that the mobile device is exiting the wireless social network.

30. The mobile device of claim 19, prior to establishing the wireless social network said hardware to:
   receive the invitation message at the second one of the mobile nodes; and
   obtain the information about the estimated duration of the wireless connection using the invitation message at the second one of the mobile nodes.

31. The mobile device of claim 19, prior to establishing the wireless social network said hardware to:
   receive the invitation message at the second one of the mobile nodes; and
   obtain information about interests of at least one user of the first one of the mobile nodes.

* * * * *